United States Patent
Kalogiros

(10) Patent No.: US 11,146,422 B1
(45) Date of Patent: Oct. 12, 2021

(54) METHOD AND SYSTEM FOR ADJUSTING THE BANDWIDTH OF A FREQUENCY DOMAIN SMOOTHING FILTER FOR CHANNEL TRACKING LOOP IN AN OFDM COMMUNICATION SYSTEM

(71) Applicant: u-blox AG, Thalwil (CH)

(72) Inventor: Dimitris Kalogiros, Athens (GR)

(73) Assignee: U-BLOX AG, Thalwil (CH)

(*) Notice: Subject to any disclaimer, the term of this patent is extended or adjusted under 35 U.S.C. 154(b) by 0 days.

(21) Appl. No.: 16/942,401

(22) Filed: Jul. 29, 2020

(51) Int. Cl.
  *H04L 25/02* (2006.01)
  *H04L 25/03* (2006.01)

(52) U.S. Cl.
  CPC ........... *H04L 25/022* (2013.01); *H04L 25/03* (2013.01)

(58) Field of Classification Search
  CPC .............. H04L 25/022; H04L 25/0212; H04L 25/0204; H04L 25/0202; H04L 25/03
  See application file for complete search history.

(56) References Cited

U.S. PATENT DOCUMENTS

| | | | | |
|---|---|---|---|---|
| 7,209,433 | B2* | 4/2007 | Scarpa | H04L 25/0236 370/206 |
| 8,737,457 | B2* | 5/2014 | Reial | H04L 25/0222 375/224 |
| 2004/0076185 | A1 | 4/2004 | Kim et al. | |
| 2006/0128326 | A1 | 6/2006 | Pietraski | |
| 2009/0202031 | A1* | 8/2009 | Karjalainen | H04W 56/0045 375/371 |
| 2017/0155528 | A1 | 6/2017 | Alexander | |
| 2020/0280927 | A1* | 9/2020 | Charipadi | H04W 52/221 |
| 2020/0336339 | A1* | 10/2020 | Nissila | H04L 25/0224 |

FOREIGN PATENT DOCUMENTS

WO  WO 2004/023672  3/2004

OTHER PUBLICATIONS

Li et al.: An Adaptive Filter Technique for Pilot Aided Transmission Systems, IEEE Transaction on Vehicular Technology, vol. 40, No. 3, Aug. 1991.

* cited by examiner

*Primary Examiner* — Sophia Vlahos
(74) *Attorney, Agent, or Firm* — Finnegan, Henderson, Farabow, Garrett & Dunner LLP

(57) ABSTRACT

An OFDM communication system, includes: a smoothing filter; an equalizer; processors; and a memory containing instructions causing the processors to perform steps of: providing to the smoothing filter a plurality of channel response estimates, each corresponding to a symbol and a channel; receiving a plurality of filtered channel response estimates, each corresponding to a value of the channel response estimate; calculating a plurality of error vectors, each having a plurality of error values, each error value being a difference between the channel response estimate and the filtered channel response estimate; obtaining a mean error vector having a plurality of mean error values, each corresponding to a subcarrier for all symbols; calculating a power of each subcarrier based on the mean error values of the mean error vector; comparing the power of each subcarrier to a threshold power; and adjusting the bandwidth of the smoothing filter based on the comparison.

20 Claims, 8 Drawing Sheets

METHOD AND SYSTEM FOR ADJUSTING THE BANDWIDTH OF A FREQUENCY DOMAIN SMOOTHING FILTER FOR CHANNEL TRACKING LOOP IN AN OFDM COMMUNICATION SYSTEM

TECHNICAL FIELD

Apparatus and methods consistent with the present disclosure relate generally to a radio receiver and a method of using a frequency domain smoothing filter for a channel tracking loop in an OFDM communication system.

BACKGROUND

In wireless communication, orthogonal frequency-division multiplexing (OFDM) is a method of data encoding and modulation that enables data to be transmitted over a series of closely space orthogonal sub-carriers of a transmission channel. OFDM enables high spectral efficiency by allowing increased data to be transmitted over a given bandwidth. Typically in OFDM communication systems, a transmitter device may encode information into data bits, modulate these data bits into a signal, and send the signal via the transmission channel. When receiving the signal, a receiver device may reverse the operations of the transmitter device in order to obtain the original information contained in the received signal. Thus, the receiver device may carry out operations such as demodulating and decoding the received signal into received data bits to restore the original information.

During propagation of the signal through a channel, distortions may result from factors such as multipath propagation. The receiver device may attempt to compensate these channel distortions in order to minimize errors caused by the distortions. This distortion compensation may be carried out by an equalizer in the receiver device. In order to reverse channel distortions, information about the state of the channel may be needed, and such information may be referred to as channel response estimates. Accuracy of the channel response estimates may directly impact the performance of the equalizer in compensating for the channel distortions.

One method of improving the accuracy of the channel response estimates is to compensate for the effect of noise on the channel response estimates. Prior attempts to compensate for the effect of noise include filtering for removing additive white Gaussian noise (AWGN) in the frequency domain or in the time domain. However, filtering with a constant bandwidth filter, especially in the frequency domain, is suboptimal and may not sufficiently compensate for the effect of noise on the channel response estimates.

SUMMARY

In accordance with the present disclosure, there is provided a method for adjusting the bandwidth of a frequency domain smoothing filter for a channel tracking loop of an OFDM communication system, comprising: receiving, by the smoothing filter, a plurality of channel response estimates, each channel response estimate corresponding to a symbol and a subcarrier; generating, by the smoothing filter, a plurality of filtered channel response estimates, each filtered channel response estimate corresponding to a value of the channel response estimate; calculating a plurality of error vectors each having a plurality of error values, each value of the error vector being a difference between the channel response estimate and the filtered channel response estimate; obtaining a mean error vector having a plurality of mean error values, each mean error value corresponding to a subcarrier for all symbols; calculating a power of each subcarrier based on the plurality of mean error values of the mean error vector; comparing the power of each subcarrier to a threshold power; and adjusting the bandwidth of the smoothing filter based on the comparison.

In accordance with the present disclose, there is also provided an OFDM communication system having adjustable bandwidth frequency domain smoothing filter for channel tracking loop, comprising: a smoothing filter; an equalizer; one or more processors; and a memory storage device containing instructions which when executed, cause the one or more processors to perform the steps of: providing to the smoothing filter a plurality of channel response estimates, each channel response estimate corresponding to a symbol and a subcarrier; receiving, from the smoothing filter, a plurality of filtered channel response estimates, each filtered channel response estimate corresponding to a value of the channel response estimate; calculating a plurality of error vectors, each having a plurality of error values, each error value being a difference between the channel response estimate and the filtered channel response estimate; obtaining a mean error vector having a plurality of mean error values, each mean error value corresponding to a subcarrier for all symbols; calculating a power of each subcarrier based on the plurality of mean error values of the mean error vector; comparing the power of each subcarrier to a threshold power; and adjusting the bandwidth of the smoothing filter based on the comparison.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise specified. The implementations set forth in the following disclosure are consistent with aspects related to the invention as recited in the appended claims.

Figure 1:
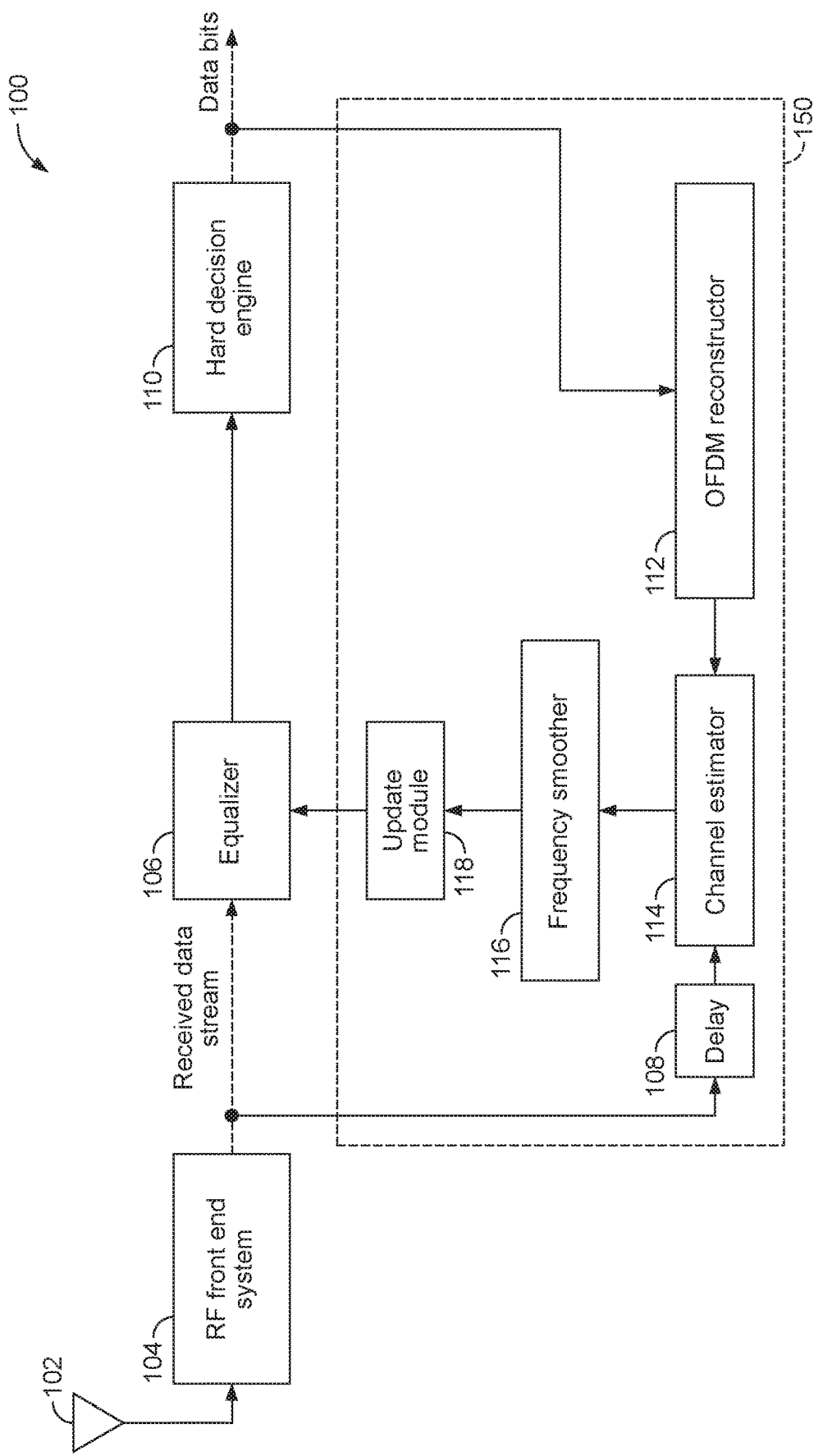
FIG. 1 is a schematic diagram illustrating an exemplary channel tracking loop of an OFDM receiver, consistent with the disclosed embodiments.

According to some embodiments, there is provided a method for adjusting the bandwidth of a frequency domain smoothing filter for a channel tracking loop of an OFDM communication system. By way of example, FIG. 1 illustrates an OFDM communication system having a channel tracking loop. An OFDM transmitter device (not illustrated) may transmit a signal for reception by a device 100 including the channel tracking loop. Device 100 may be an OFDM receiver, and may include an antenna 102, an RF front end system 104, an equalizer 106, a hard decision engine 110, and a channel estimation module 150.

RF front end system 104 may refer to various components for down-converting a received RF signal from an RF carrier frequency to a base band frequency, and for synchronizing the down-converted base band signal. RF front end system 104 may include one or more of filters, mixers, oscillators, analog-to-digital converters, and/or other circuitry and components known in the art. In some embodiments, RF front end system 104 receives a data stream contained in the received RF signal. The data stream may contain OFDM symbols. OFDM symbols, or simply symbols, refer to a unit of information. A symbol may be a waveform, state change, or other similar information carrying unit, and may contain one or more data bits, such as a series of "0"s or "1" s. A person or ordinary skill in the art will appreciate that RF front end system 104 may be modified for various design reasons without detracting from the disclosed embodiments.

In some embodiments, the symbols received are spread across a plurality of subcarriers. A subcarrier may be a sub-division of a channel. In the frequency domain, a channel has a bandwidth, and a subcarrier may be a smaller division of frequency range within the bandwidth of the channel. In OFDM systems, the number of subcarriers may be designed according to technical standards, laws, or regulations of a jurisdiction.

Equalizer 106 may refer to circuitry, components, modules, or processors for compensating for signal distortions. Equalizer 106 may be implemented as part of a processor, which executes operations, such as mathematical or logical operations, determined by one or more distortion compensation algorithms. Equalizer 106 provides as output, an equalized data stream, which may contain compensated symbols.

Hard decision engine 110 may refer to a type of decoder in which a signal level (e.g. voltage) is compared to a threshold, and an outcome is assigned based on whether the signal level reaches the threshold. For example, hard decision engine 100 receives as input, equalized data stream containing compensated symbols, and assigns the bits of the symbols one of "0" or "1" value. If, for example, the threshold value is 0.5 V, bits less than 0.5 V will be assigned value of "0", and bits greater than or equal to 0.5 V will be assigned value of "1". Outputs of hard decision engine 110 are referred to herein as data bits.

Channel estimation module 150 may refer to components and modules for deriving channel response estimates. "Channel response estimates" as used herein refer to information about the state of the channel in the frequency domain. In some embodiments, channel estimation module 150 may also provide updates to the one or more distortion compensation algorithms used by equalizer 106. Channel estimation module 150 may be implemented by a processor. Channel estimation module 150 may include an OFDM reconstructor 112, a channel estimator 114, a delay module 108, a frequency smoother 116, and an update module 118. As used herein, a processor may be device, components, or circuits capable of receiving inputs and generating outputs. Examples of processors may include microprocessors (e.g. digital signal processors, CPUs, GPUs), logic gates arrays (e.g. FPGA), or other dedicated integrated circuit (IC) chips (e.g. ASICs). In some embodiments, the illustrated functions of channel estimation module 150 may be implemented as software modules executed by the processor.

OFDM reconstructor 112 rebuilds symbols from the data bits decoded by hard decision engine 110. In some embodiments, the symbols are rebuilt by OFDM reconstructor 112 by simulating the encoding and modulating steps of an OFDM transmitter, re-creating what the symbols may have appeared to be prior to transmission. The rebuilt symbols are provided as outputs in a reconstructed data stream to channel estimator 114.

Channel estimator 114 produces channel response estimates based on the received data stream via delay module 108 and the reconstructed data stream from OFDM reconstructor 112. Delay module 108 creates a time delay so that the received data stream arrives at channel estimator 114 at the same time as the corresponding reconstructed data stream arrives. The reconstructed data stream contains the rebuilt symbols, and the received data stream contains the received symbols. For example, $OFDM_k$ is the $k_{th}$ symbol received by RF front end system 104 at time $t_0$. $OFDM_k$ is then processed by equalizer 106, decoded into data bits by hard decision engine 110, and rebuilt into $OFDM_k'$ by OFDM reconstructor 112. $OFDM_k'$ arrives at channel estimator 114 at a time $t_1$, after the time $t_0$. Therefore, delay module 108 provides the time delay to $OFDM_k$, such that both $OFDM_k$ and $OFDM_k'$ arrives at channel estimator 114 at time $t_1$. In some embodiments, the difference between time $t_1$ and $t_0$ may be expressed in terms of the number of symbols received during the delay. For example, m number of symbols may have been received in the time between $t_1$ and $t_0$, hence delay module 108 delays by m number of symbols, so that $OFDM_k'$ corresponds to $OFDM_{k-m}$ at channel estimator 114. Based on the received symbols and the corresponding rebuilt symbols, channel estimator 114 calculates channel response estimates.

In some embodiments, the channel response estimates, $\hat{H}$, may be calculated for each subcarrier of each symbol. For example, a channel response estimate $\hat{H}_{k-m,n}$ may be calculated for the $n_{th}$ subcarrier of the $(k-m)_{th}$ symbol. $\hat{H}$ may be calculated using mathematical operations such as multiplication, division, inversion, convolution, and/or other methods known in the art.

A person or ordinary skill in the art will now appreciate that k and m may be any integer. For simplicity of the notations in the remainder of the description, the functionality of the delay module 108 is omitted, and the case where m=0 is considered.

Frequency smoother 116 receives channel response estimates $\hat{H}$ as inputs, and produces frequency smoothed channel response estimates $\tilde{H}$ as outputs. In some embodiments, frequency smoother 116 may provide adaptive frequency smoothing, the detailed operation of which will be described in detail below. In some embodiments, frequency smoother 116 may be a smoothing filter.

Update module 118 receives filtered channel response estimates $\tilde{H}$, and provides updates to any distortion compensation algorithms used by equalizer 106 to compensate for distortions. Since distortions may be dependent on characteristics of the channels, changes in these characteristics may be accounted for in order to achieve improved compensation. Filtered channel response estimates $\tilde{H}$ provide information on these characteristics, so newly produced $\tilde{H}$ may change the operation of equalizer 106. In some embodiments, distortion compensation algorithms may be updated at each instance values of $\tilde{H}$ are updated. For example, if a new channel response estimate is calculated for each symbol received, distortion compensation algorithms may be updated correspondingly.

Figure 2:
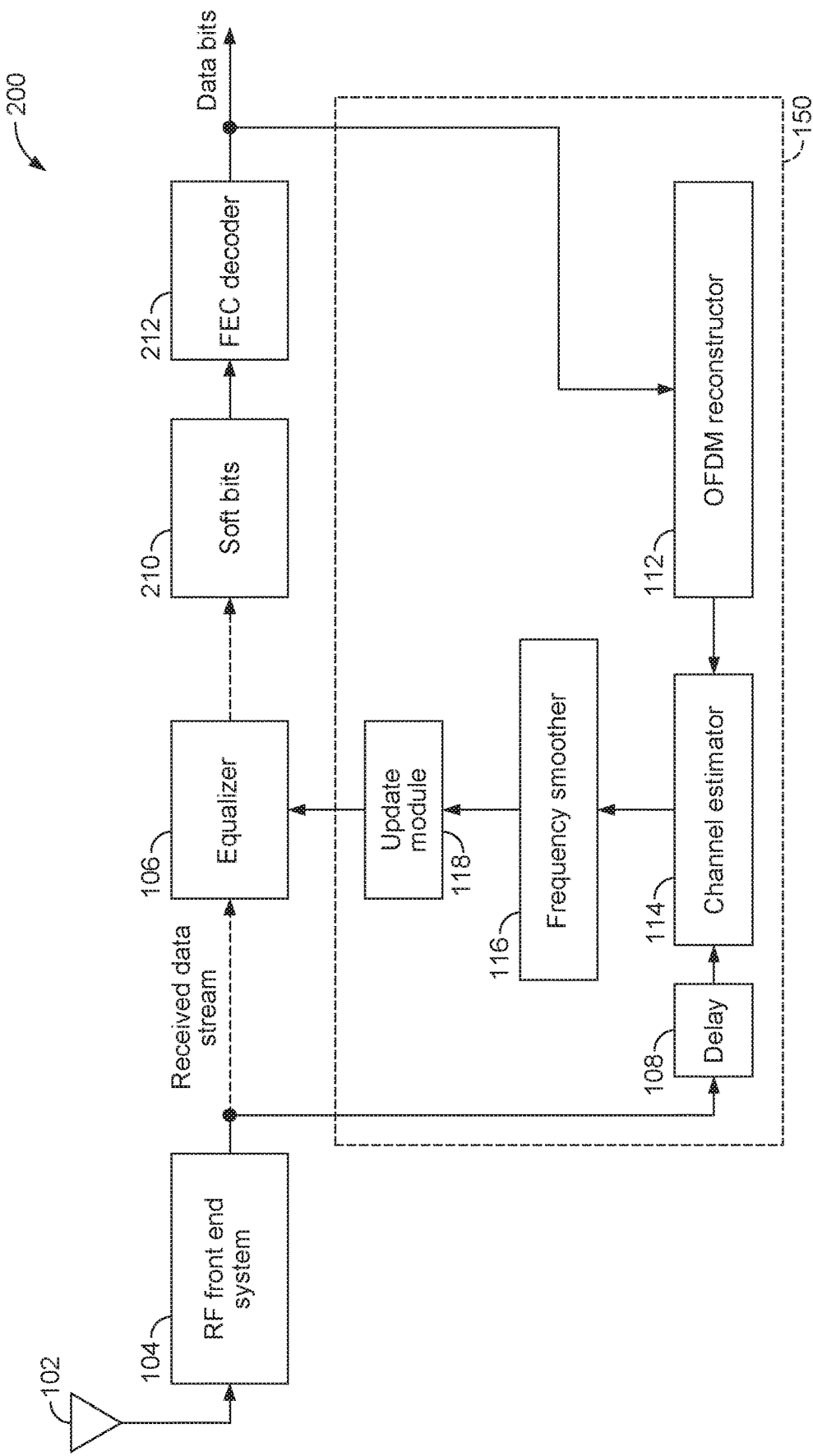
FIG. 2 is a schematic diagram illustrating an alternative channel tracking loop of an OFDM receiver, consistent with the disclosed embodiments.

As another example, FIG. 2. illustrates an alternative channel tracking loop of an OFDM communication system. An alternative to hard decision engine 110 of device 100 may be a "soft decision" method. As illustrated in FIG. 2, a device 200 may include a soft bits engine 210 and a forward error correction (FEC) decoder 212 to decode the compensated symbols. For example, soft bits engine 210 and forward error correction (FEC) 212 may be implemented in a Viterbi decoder. In contrast to a "hard decision" using only a threshold to assign values, a soft decision method may take into account a range of thresholds to assign values and may take into account a reliability of input data when assigning values. A person of ordinary skill in the art will now appreciate that device 200 is substantially similar to device 100 except as described above, and the detailed description of device 200 is omitted.

Figure 3:
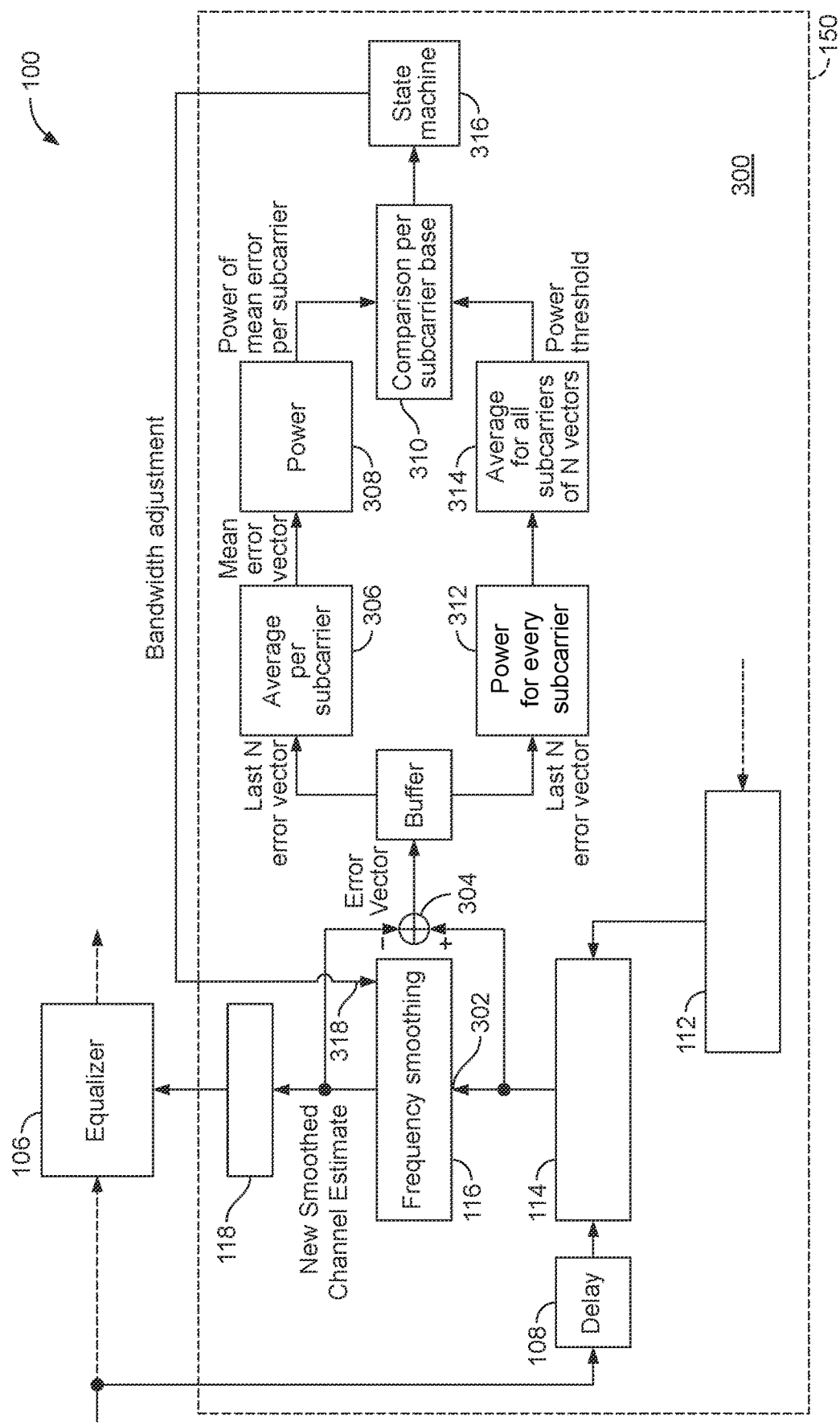
FIG. 3 is a schematic flow diagram illustrating an exemplary process for an adaptive bandwidth frequency domain smoothing filter, consistent with the disclosed embodiments.

Adaptive bandwidth frequency domain smoothing by device 100 in FIG. 1 will be described below with reference to FIG. 3. Process 300 may be carried out by a processor. A person of ordinary skill in the art will appreciate that the operations of frequency domain smoothing by device 200 in FIG. 2 may be substantially similar.

In step 302, process 300 includes receiving, by a smoothing filter, a plurality of channel response estimates, each channel response estimate corresponding to a symbol and a subcarrier. The smoothing filter may be part of frequency smoother 116, and the channel response estimates may be represented by $\hat{H}_{k,n}$ produced by channel estimator 114, for the $n_{th}$ subcarrier of the $k_{th}$ symbol. Process 300 also includes generating, by the smoothing filter, a plurality of filtered channel response estimates, each filtered channel response estimate corresponding to a value of the channel response estimate. Each filtered channel response estimate may be represented by $\tilde{H}_{k,n}$, and corresponds to $\hat{H}_{k,n}$. $\tilde{H}_{k,n}$ is calculated by the convolution of the channel response estimate comprising all subcarriers of the symbol OFDM$_k$, and the impulse response, SF, of the smoothing filter, as $\tilde{H}_{k,n}=SF*\hat{H}_{k,n}$, where the convolution operation is performed with respect to the subcarrier index n.

In some embodiments, the smoothing filter may be an impulse response filter, such as a finite impulse response (FIR) filter or an infinite impulse response filter (IIR). In some embodiments, the smoothing filter may include a plurality of impulse response filters, each of which having a different bandwidth. For example, the smoothing filter may include at least two impulse response filters, one with a comparatively narrow bandwidth, and another one with a comparatively wide bandwidth. Frequency smoother 116 may apply one of these impulse response filters to the $\hat{H}_{k,n}$ to produce $\tilde{H}_{k,n}$. In some embodiments, the impulse response filters may be implemented as mathematical operations carried out by a processor.

In step 304, process 300 includes calculating a plurality of error vectors each having a plurality of error values, each value of the error vector being a difference between the channel response estimate and the filtered channel response estimate. For example, an error value $E_k[n]$ may be the difference between $\hat{H}_{k,n}$ and $\tilde{H}_{k,n}$, $E_k[n]=\hat{H}_{k,n}-\tilde{H}_{k,n}$. An error vector, or $E_k$, may contain the error values $E_k[n]$ for all subcarriers of the $k_{th}$ symbol.

In step 306, process 300 includes obtaining a mean error vector having a plurality of mean error values, each mean error value corresponding to a subcarrier for all symbols. For example, the first mean error value, $\bar{E}[1]$, corresponds to the first subcarrier, the second mean error value, $\bar{E}[2]$, corresponds to the second subcarrier, and so on. The mean error vector, $\bar{E}[n]$, may be calculated by the following expression:

$$\bar{E}[n] = \frac{1}{N}\sum_{i=0}^{N-1} E_{k-i}[n]$$

N denotes the number of error vectors last received. In some embodiments, the number of error vectors last received, N, may be determined by the size of a memory buffer. For example, a buffer may be provided to store each incoming calculated error vector. The buffer may be a computer-readable storage media having a fixed amount of memory capable of storing only N error vectors. In some embodiments, once the limit of the buffer memory is reached, the oldest error vector is removed in order to receive the newest incoming error vector. In some embodiments, $\bar{E}[n]$ is recalculated at each instance an error vector $E_k$ is received by the buffer.

In step 308, process 300 includes calculating a power of each subcarrier based on the plurality of mean error values of the mean error vector. The power of each subcarrier may be a mean power of errors of each subcarrier for all symbols, MPES[n]. MPES[n] is given by the expression:

$$\text{MPES}[n]=|\bar{E}[n]|^2$$

In some embodiments, MPES[n] is recalculated at each instance when $\bar{E}[n]$ is updated.

In step 312, process 300 includes calculating a plurality of power values, each power value corresponding to one of the error values. For example, a power value may be calculated for each one of the error values $E_k[n]$, and the power value is equal to $|E_k[n]|^2$. In some embodiments, a power value is calculated for every error value $E_k[n]$ stored in the memory buffer. In some embodiments, power values are calculated at each instance a new error vector is received by the memory buffer.

In step 314, process 300 includes calculating a threshold power based on an average of the plurality of power values. For example, the threshold power PT may be obtained by dividing the sum of the plurality of power values by the total number of power values, given as the following expression:

$$PT = \frac{1}{N \cdot |DS|} \sum_{i=0}^{N-1} \sum_{n \in DS} |E_{k-i}[n]|^2$$

DS denotes a set containing subcarriers for both data and pilot signal in the transmission channel, and |DS| denotes the number of elements in DS. In some embodiments, the threshold power PT may be recalculated at each instance a new error vector is received by the memory buffer. A person of ordinary skill in the art will now appreciate that DS may be dependent on design choices based on one of technical standards, laws, or regulations of a jurisdiction.

In step 310, process 300 includes comparing the power of each subcarrier to a threshold power. For example, MPES[n] is compared to PT, and when the difference between MPES[n] and PT is greater than zero for the $n_{th}$ subcarrier, the power of the error of the $n_{th}$ subcarrier is determined to have exceeded the threshold power.

Figure 4:
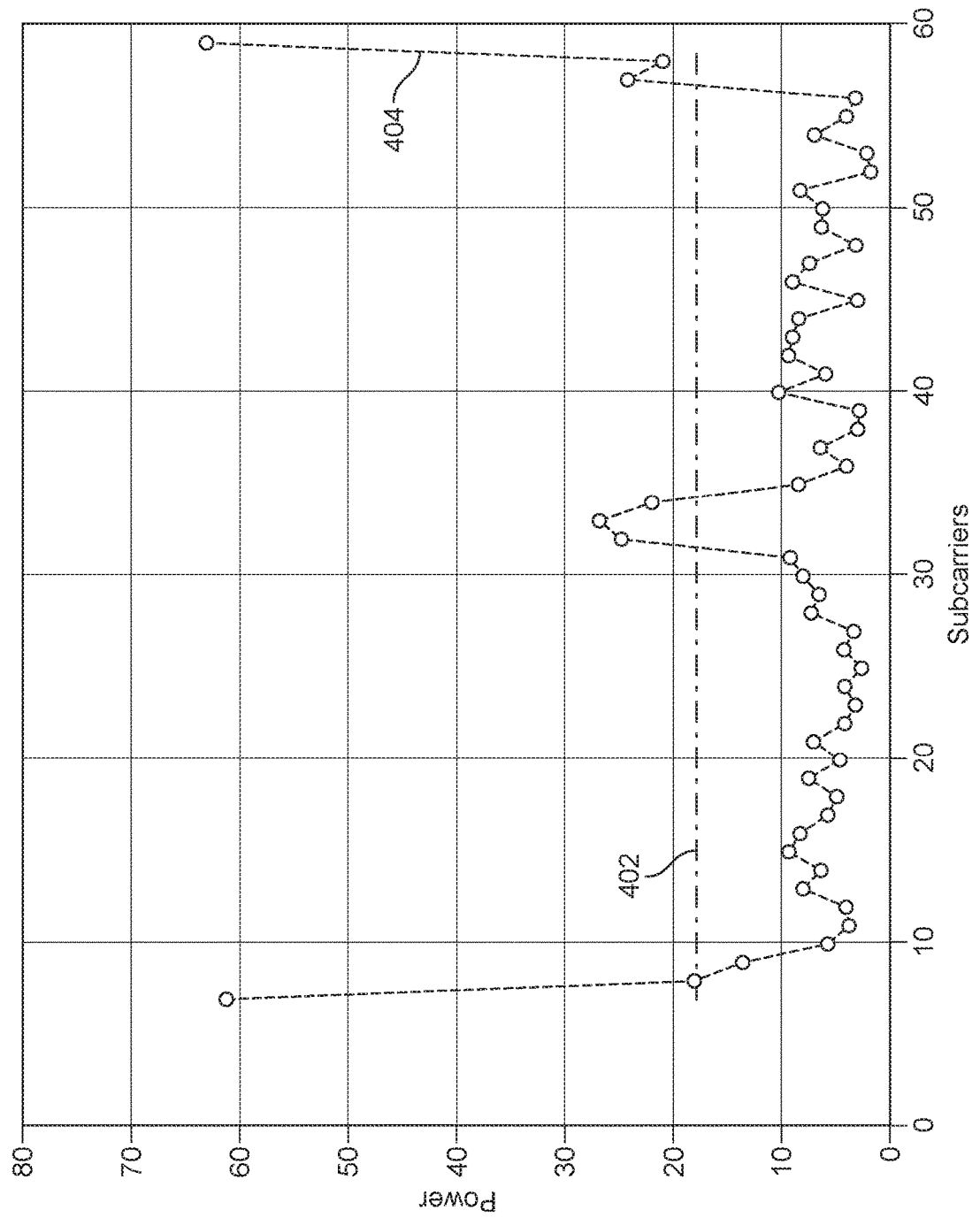
FIG. 4 is a simulation plot illustrating examples of smoothing errors, consistent with the disclosed embodiments.

By way of example, FIG. 4 is a plot showing the comparison of MPES[n] and PT. The vertical axis of FIG. 4 represents power and the horizontal axis represents subcarriers within the set of DS. In the example, the subcarriers within the set of DS are from n=7 to n=59. Curve 402 represents the threshold power PT, and curve 404 represents MPES[n].

In some embodiments, comparing the power of each subcarrier to a threshold power may include calculating a number of smoothing errors based on the comparison, the number of smoothing errors being based on a number of subcarriers whose power exceeds the threshold power. The number of smoothing errors (NSE) may be the number of subcarriers for which the difference between MPES[n] and PT is greater than zero. By way of example, as illustrated in FIG. 4, since MPES[n] is greater than PT for 7 different subcarriers (e.g. at n=7, 32, 33, 34, 57, 58 and 59), NSE is equal to 7.

In some embodiments, comparing the power of each subcarrier to a threshold power may alternatively include calculating a power of smoothing errors, the power of smoothing errors being based on a sum of differences between the power of each subcarrier exceeding the threshold power and the threshold power. The power of smoothing error, PSE, may be given by the following expression:

$$PSE \triangleq \sum_{\substack{arg(MPES[n]>PT) \\ n}} \frac{MPES[n] - PT}{PT}$$

$$\arg_{n}(MPES[n] > PT)$$

represents the subcarriers whose MPES[n] is greater than PT. By way of example and as noted above, in FIG. 4, MPES[n] is greater than PT for 7 different subcarriers (e.g. at n=7, 32, 33, 34, 57, 58 and 59), so PSE is equal to the sum of the differences between MPES[n] and PT, divided by PT, for only those subcarriers.

In step 316, process 300 determines, based on the comparison in step 310, a bandwidth adjustment. In some embodiments, the determination may include increasing a bandwidth, decreasing a bandwidth, or maintaining the current bandwidth. In some embodiments, the bandwidth adjustment may be determined by a state machine implemented by a processor. Bandwidth adjustment may be communicated to frequency smoother 116.

In step 318, process 300 carries out the bandwidth adjustment in frequency smoother 116. Frequency smoother 116 may carry out frequency smoothing of the channel response estimates $\hat{H}_{k,n}$ using the adjusted bandwidth determined in step 316. As discussed previously, frequency smoother 116 may include a plurality of filters, such as impulse response filters, each having a different bandwidth. Based on the determination of step 316, frequency smoother 116 may apply the filter with the corresponding bandwidth as determined by the bandwidth adjustment. In some embodiments, the bandwidth adjustment includes an instruction to increase or decrease the bandwidth to the next available impulse response filter. For example, if frequency smoother 116 receives an instruction to increase bandwidth, it may apply one of the plurality of filters having the next highest bandwidth relative to the current filter.

Figure 5:
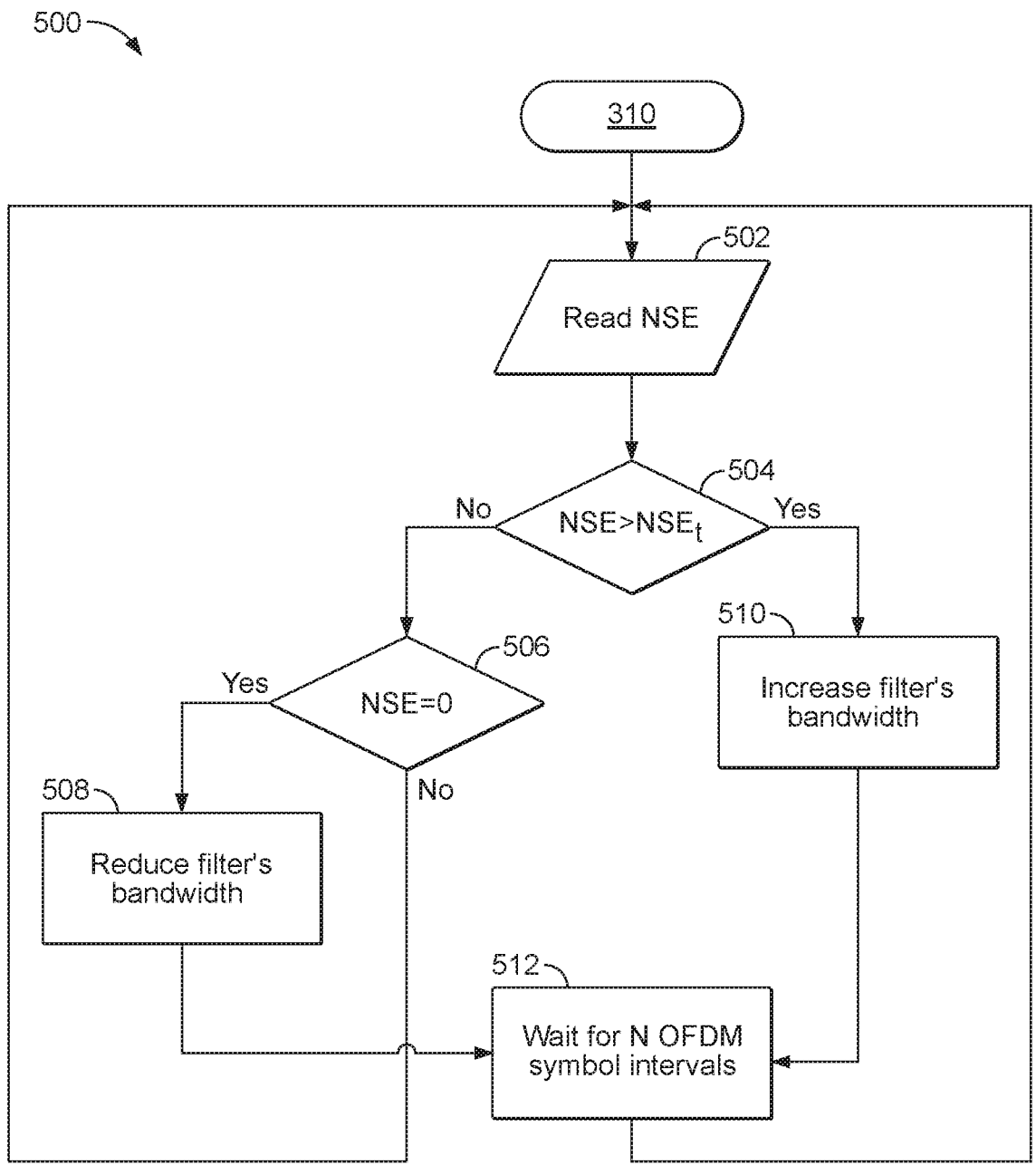
FIG. 5 is a flow chart illustrating an exemplary process for determining adaptive bandwidth frequency domain smoothing filtering, consistent with the disclosed embodiments.

Details of step 316 are described below with reference to a process 500 for determining adaptive bandwidth frequency domain filtering, illustrated in FIG. 5.

In step 502, process 500 includes receiving the comparison results of step 310. In some embodiments, the comparison results include the number of smoothing errors, NSE, determined in step 310.

In step 504, process 500 includes determining whether the number of smoothing errors NSE is greater than a threshold value $NSE_t$. The threshold value, $NSE_t$, is a value greater than 0, and may be a predetermined value or a dynamic value. If NSE>$NSE_t$ (step 504—YES), process 500 proceeds to step 510. If NSE<$NSE_t$ (step 504—NO), process 500 proceeds to step 506.

In step 506, process 500 includes determining whether the number of smoothing errors is equal to 0. If the number of smoothing errors (NSE) is greater than zero and lower than the threshold value $NSE_t$, the bandwidth of the filter remains unchanged. For example, if NSE≠0 (step 506—NO), process 500 returns back to step 502 and waits for a new NSE. If NSE=0 (step 506—YES), process 500 proceeds to step 508.

In step 508, process 500 includes determining that the bandwidth of the smoothing filter is to be reduced by a first predetermined amount when the number of smoothing errors is equal to zero. In some embodiments, the first predetermined amount may correspond to one of the plurality of filters included in frequency smoother 116. Process 500 then proceeds to step 512.

In step 510, process 500 includes determining that the bandwidth of the smoothing filter is to be increased by a second predetermined amount. The second predetermined amount may be identical to the first predetermined amount. In some embodiments, the second determined amount may correspond to another one of the plurality of filters included in frequency smoother 116. Process 500 then proceeds to step 512.

In step 512, process 500 includes waiting for a number of symbol intervals. For example, after determining that the bandwidth of the smoothing filter is to be increased or decreased, some number of symbol intervals may pass before process 500 repeats. In some embodiments, the number of symbol intervals that pass may be N, which may be the number of symbols stored in the buffer. A person of ordinary skill in the art will now appreciate that process 500 may wait some other symbol intervals, and this wait period may be of any length desirable to achieve design goals.

Figure 6:
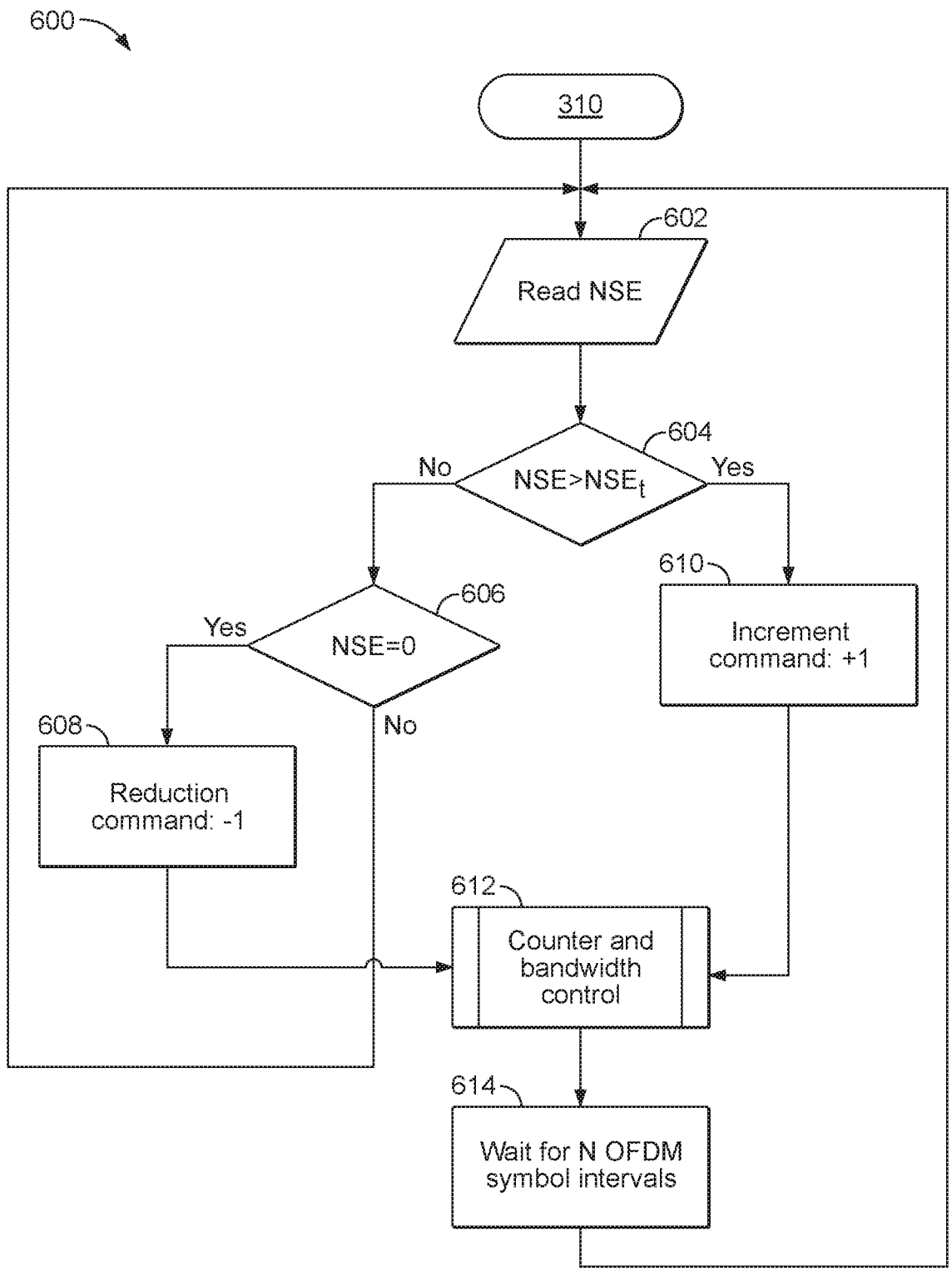
FIG. 6 is a flow chart illustrating an alternative process for determining adaptive bandwidth frequency domain smoothing filtering, consistent with the disclosed embodiments.

In some embodiments, step 316 may be implemented in an alternative state machine by process 600 described with reference to FIG. 6.

In step 602, process 600 includes receiving the comparison results of step 310. In some embodiments, the comparison results include the number of smoothing errors, NSE, as determined in step 310.

In step 604, process 600 includes determining whether the number of smoothing errors is greater than a threshold value. The threshold value, $NSE_t$ is a value greater than 0, and may be a predetermined value or a dynamic value. If NSE>$NSE_t$ (step 604—YES), process 600 proceeds to step 610. If NSE<$NSE_t$ (step 604—NO), process 600 proceeds to step 606.

In step 606, process 600 includes determining whether the number of smoothing errors is equal to zero. If the number of smoothing errors is greater than zero and lower than the threshold value $NSE_t$, no change is made. For example, if NSE≠0 (step 606—NO), process 600 returns to step 602 and waits for a new result from step 310. If NSE=0 is (step 606—YES), process 600 proceeds to step 608.

In step 608, process 600 includes decreasing a counter by a first increment. The counter is a numerical value which may be updated, tracked, or stored in memory by a processor. Process 600 then proceeds to step 612.

In step 610, process 600 includes increasing the counter by a second increment. The second increment may be identical to the first increment. Process 600 then proceeds to step 612.

In step 612, process 600 includes making a bandwidth adjustment based on a value of the counter. For example, if the value of the counter is less than a threshold value, the bandwidth of the smoothing filter is decreased by a first predetermined amount. If the value of the counter is greater than a threshold value, the bandwidth of the smoothing filter is increased by a second predetermined amount. The first predetermined amount may be identical to the second predetermined amount. In some embodiments, the first predetermined amount may correspond to one of the plurality of filters included in frequency smoother 116, and the second predetermined amount may correspond to another one of the plurality of filters included in frequency smoother 116. Process 600 then proceeds to step 614.

In step 614, process 600 includes waiting for a predetermined interval. The predetermined interval may be a number of symbol intervals, which may be N, the number of symbols being stored in the buffer. A person of ordinary skill in the art will now appreciate that process 600 may wait some other number of symbol intervals, and this predetermined interval may be of any length desirable to achieve design goals.

In some embodiments, step 316 may alternatively be based on the power of smoothing errors rather than the number of smoothing errors.

Figure 7:
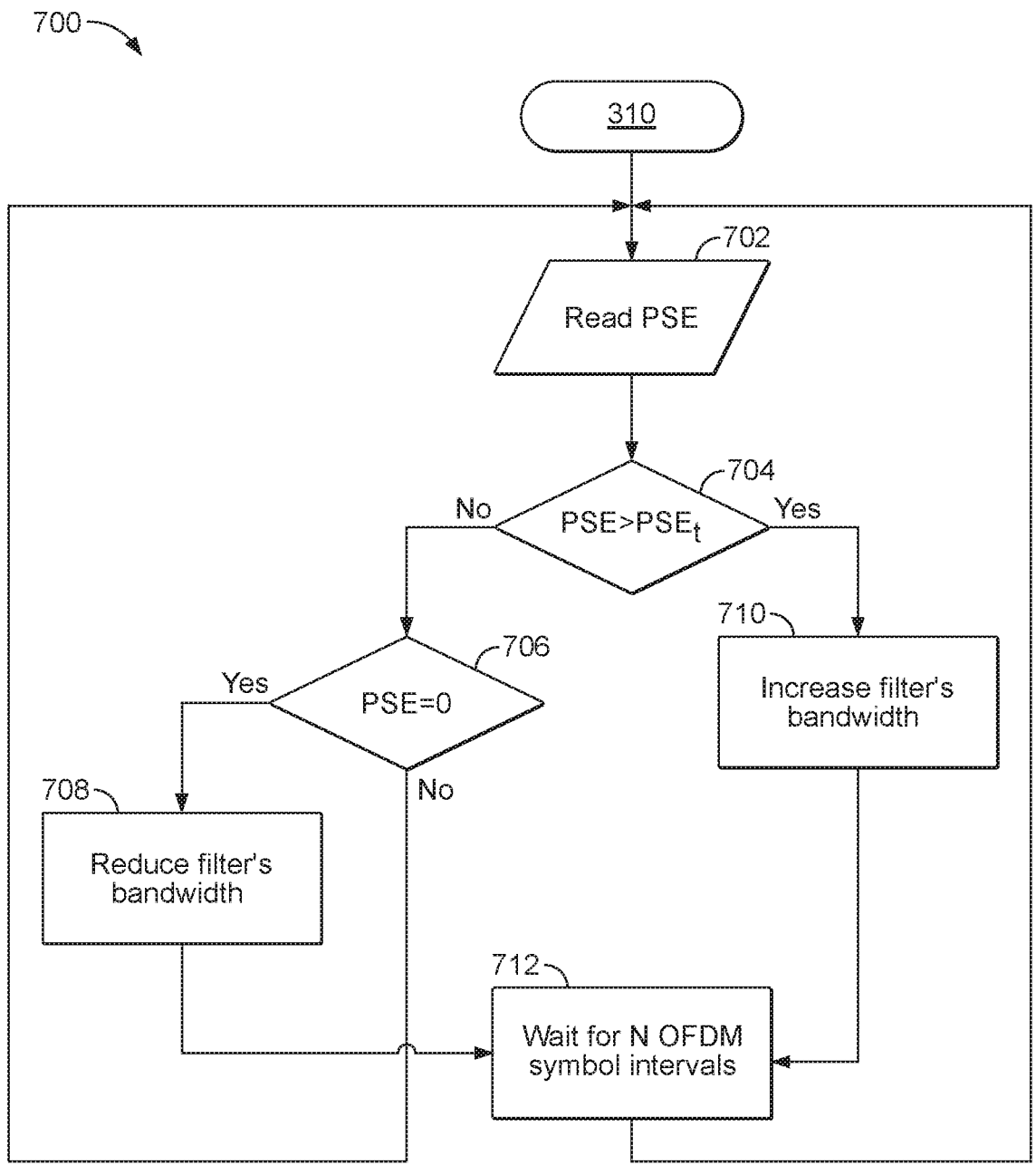
FIG. 7 is a flow chart illustrating another alternative process for determining adaptive bandwidth frequency domain smoothing filtering, consistent with the disclosed embodiments.

In step 702 of FIG. 7, process 700 includes receiving the comparison results of step 310. The comparison results include the power of smoothing errors, PSE, determined in step 310.

In step 704, process 700 includes determining whether the power of smoothing errors PSE is greater than a threshold value $PSE_t$. The threshold value, $PSE_t$, a value greater than 0, may be a predetermined value or a dynamic value. If PSE>$PSE_t$ (step 704—YES), process 700 proceeds to step 710. If PSE<$PSE_t$ (step 704—NO), process 700 proceeds to step 706.

In step 706, process 700 includes determining whether the power of smoothing error PSE is equal to 0. If the power of smoothing errors PSE is greater than zero and lower than the threshold value $PSE_t$, the bandwidth of the filter remains unchanged. For example, if PSE≠0 (step 706—NO), process 700 returns to step 702 and waits for a new PSE. If PSE=0 (step 706—YES), process 700 proceeds to step 708.

Steps 708-712 may be substantially similar that of steps 508-512, and further description is omitted. In some embodiments, determining bandwidth adjustment using the power of smoothing errors (PSE) may yield more accurate information about the state of smoothing errors, and thus may be preferable. Alternatively, determining bandwidth adjustment using the number of smoothing errors (NSE) may require less computational resource, and may be preferable in applications where computational resources are scarce.

Figure 8:
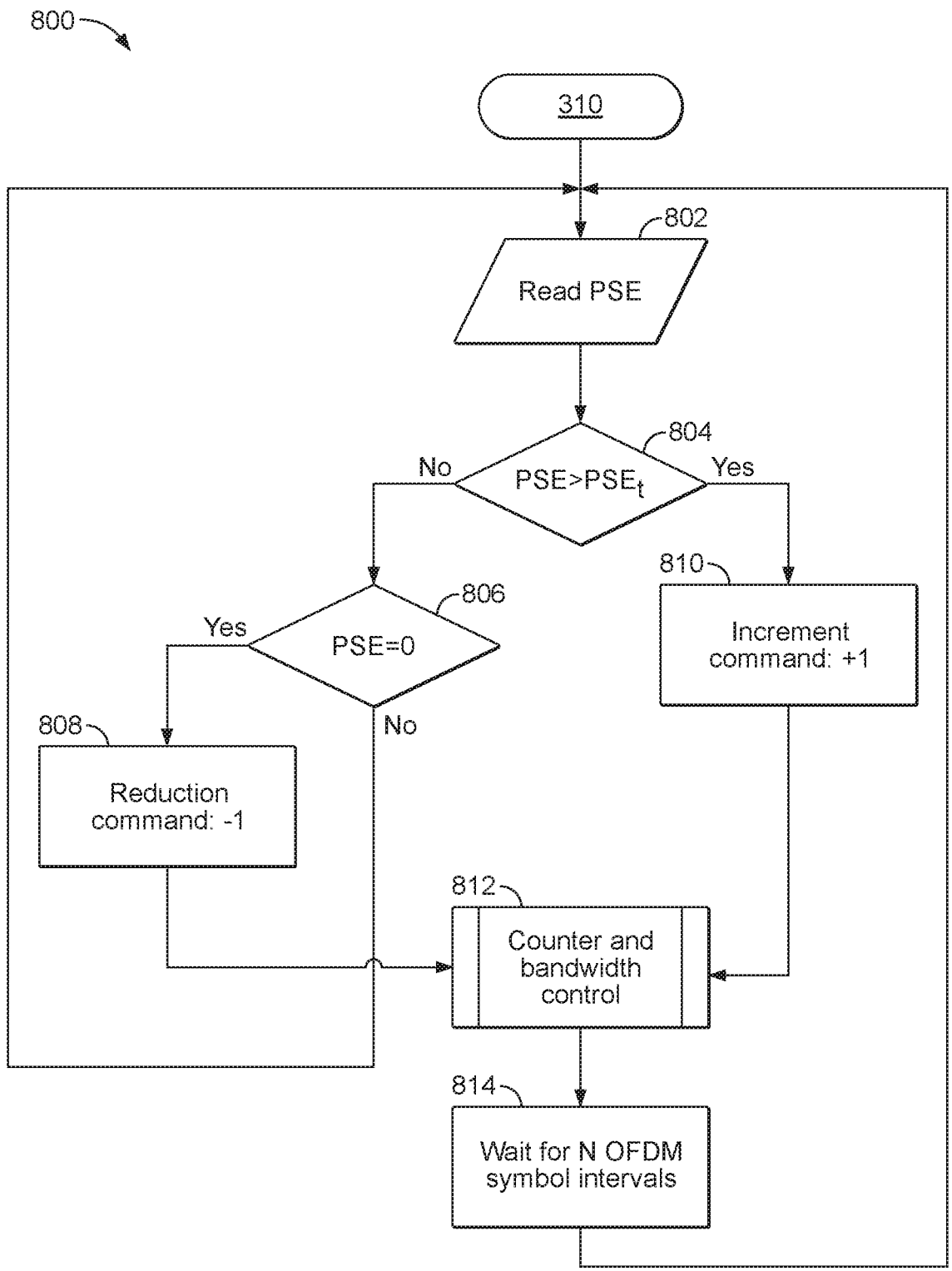
FIG. 8 is a flow chart illustrating yet another alternative process for determining adaptive bandwidth frequency domain smoothing filtering, consistent with the disclosed embodiments.

In some embodiments, process 600 may alternatively be based on the power of smoothing errors rather than the number of smoothing errors. FIG. 8 is a flow chart illustrating yet another alternative process for determining adaptive bandwidth frequency domain smoothing filtering.

In step 802, process 800 includes receiving the comparison results of step 310. The comparison results include the power of smoothing errors, PSE, determined in step 310.

In step 804, process 800 includes determining whether the power of smoothing errors PSE is greater than a threshold value $PSE_t$. The threshold value, $PSE_t$, a value greater than 0, may be a predetermined value or a dynamic value. If PSE>$PSE_t$ (step 804—YES), process 800 proceeds to step 810. If PSE<$PSE_t$ (step 804—NO), process 800 proceeds to step 806.

In step 806, process 800 includes determining whether the power of smoothing errors PSE is equal to 0. If the power of smoothing errors PSE is greater than zero and lower than the threshold value $PSE_t$, the bandwidth of the filter remains unchanged. For example, if PSE≠0 (step 806—NO), process 800 returns to step 802 and waits for a new PSE. If PSE=0 (step 806—YES), process 800 proceeds to step 808.

Steps 808-812 may be substantially similar that of steps 608-612, and further description is omitted.

Typically, additive white Gaussian noise (AWGN) may be used to model the noise of the transmission channel and frequency smoother 116 may be optimized to filter the channel response estimates based on the assumption of an almost flat-fading AWGN channel model. Generally, for example, if it is assumed that $x_{k,n}$ is the n-th subcarrier of the k-th transmitted OFDM symbol, $H_{k,n}$ is the channel coefficient, and $y_{k,n}$ is the corresponding received subcarrier, then:

$$y_{k,n}=H_{k,n} \cdot x_{k,n}+\text{awgn}_{k,n}$$

where $\text{awgn}_{k,n}$ denotes the AWGN component. At the receiver, an estimation, $\hat{x}_{k,n}$, for the value of the transmitted subcarrier is calculated based on the observation of $y_{k,n}$. Assuming $\hat{x}_{k,n} \approx x_{k,n}$, the channel response estimate $\hat{H}_{k,n}$ is calculated as:

$$\hat{H}_{k,n} = \frac{y_{k,n}}{\hat{x}_{k,n}} \approx H_{k,n} + \frac{\text{awgn}_{k,n}}{\hat{x}_{k,n}}$$

The last term $$\frac{\text{awgn}_{k,n}}{\hat{x}_{k,n}}$$

denotes the distortion generated by AWGN on the channel estimates. The aim of frequency smoother 116 is to optimally choose the bandwidth of a low pass filter in order to remove, as much as possible, the noise term $$\frac{\text{awgn}_{k,n}}{\hat{x}_{k,n}},$$

while retaining characteristics of the channel coefficient $H_{k,n}$. In some instances, when the frequency response of the channel is relatively flat with few or no deep notches, an impulse response filter with a narrow bandwidth may be chosen to more efficiently remove the noise term $$\frac{awgn_{k,n}}{\hat{x}_{k,n}}.$$

However, under some conditions, e.g. in a multipath propagation environment, in which a channel's frequency response may exhibit spikes and deep notches, a wide bandwidth impulse response filter may be more suitable. These conditions may occur, for example, in the context of automobiles, where a receiver located in an automobile may be moving fast or moving through a complex propagation environment. High Doppler effect and multi-path reflection of RF signals due to buildings or other geographic features may cause spikes and deep notches in the channel response. Thus, filters optimized for only AWGN may not provide optimal frequency smoothing under these environmental conditions.

A person of ordinary skill in the art will now appreciate that the disclosed embodiments of the present disclosure may provide adaptive filtering to compensate for both AWGN and the other noise components discussed above, by providing bandwidth adjustment to frequency smoothing. In some embodiments, the bandwidth adjustment may be provided by applying two or more different impulse response filters, each having a different bandwidth. For example, referring again to FIG. 4, if the number of smoothing errors (NSE) or the power of smoothing errors (PSE) is greater than threshold values, there may be a higher likelihood that a wider bandwidth filter is needed. In contrast, if the number of smoothing errors (NSE) or the power of smoothing errors (PSE) is zero, there may be a higher likelihood that the current filtering bandwidth is too wide, and a narrower bandwidth filter is needed.

In some embodiments, the threshold values, $NSE_t$ and $PSE_t$, may be dynamic values dependent on an environmental condition. Environmental conditions may refer to conditions that affect RF signal reception by the receiver. The environmental conditions may include the velocity of the receiver, and/or the presence or absence of objects that may reflect or obstruct RF signals. In some embodiments, the threshold values $NSE_t$ and $PSE_t$ may each have multiple values, stored in a computer-readable storage media, and a different one of the these multiple values may be used in process 500, 600, 700, or 800 depending on the environmental conditions of the receiver. In some embodiments, a processor may determine the suitable values of $NSE_t$ or $PSE_t$ based on GPS coordinates of the receiver. For example, the velocity of the receiver may be determined based on changes in the GPS coordinates over time. Similarly, based on the GPS coordinates, the processor may determine that a receiver is located in an urban region, and thus may be in the presence of many reflective objects, while a receiver outside an urban region may be in the presence of few reflective objects.

The computer-readable storage media of the present disclosure may be a tangible device that can store instructions for use by an instruction execution device, such as a processor described above. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions of the present disclosure, such as any software modules or algorithms executable by a processor, may be assembler instructions, instruction-set-architecture (ISA) instructions, machine instructions, machine-dependent instructions, microcode, firmware instructions, state-setting data, or source code or object code written in any combination of one or more programming languages, including an object-oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The flowcharts and block diagrams in the figures illustrate examples of the architecture, functionality, and operation of possible implementations of systems, methods, and devices according to various embodiments. It should be noted that, in some alternative implementations, the functions noted in blocks may occur out of the order noted in the figures. For example, two blocks shown in succession may, in fact, be executed substantially concurrently, or the blocks may sometimes be executed in the reverse order, depending upon the functionality involved.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments," "another embodiment" or "alternative embodiment" in various places in the present disclosure do not all necessarily refer to the same embodiment, nor are separate or alternative embodiments necessarily mutually exclusive of other embodiments.

It should be understood that the steps of the example methods set forth herein are not necessarily required to be performed in the order described, and the order of the steps of such methods should be understood to be merely an example. For example, two blocks shown in succession may, in fact, be executed substantially concurrently, or the blocks may sometimes be executed in the reverse order, depending upon the functionality involved. Likewise, additional steps may be included in such methods, and certain steps may be omitted or combined, in methods consistent with various embodiments.

As used in the present disclosure, the word "exemplary" is used herein to mean serving as an example, instance, or illustration. Any aspect or design described herein as "exemplary" is not necessarily to be construed as preferred or advantageous over other aspects or designs. Rather, use of the word is intended to present concepts in a concrete fashion.

As used in the present disclosure, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

It will be further understood that various modifications, alternatives and variations in the details, materials, and arrangements of the parts which have been described and illustrated in order to explain the nature of described embodiments may be made by those skilled in the art without departing from the scope. Accordingly, the following claims embrace all such alternatives, modifications and variations that fall within the terms of the claims.

What is claimed is:

1. A method for adjusting bandwidth of a frequency domain smoothing filter for a channel tracking loop of an OFDM communication system, comprising:
   receiving, by the smoothing filter, a plurality of channel response estimates, each channel response estimate corresponding to a symbol and a subcarrier;
   generating, by the smoothing filter, a plurality of filtered channel response estimates, each filtered channel response estimate corresponding to a value of the channel response estimate;
   calculating a plurality of error vectors each having a plurality of error values, each value of the error vector being a difference between the channel response estimate and the filtered channel response estimate;
   obtaining a mean error vector having a plurality of mean error values, each mean error value corresponding to a subcarrier for all symbols;
   calculating a power of each subcarrier based on the plurality of mean error values of the mean error vector;
   comparing the power of each subcarrier to a threshold power; and
   adjusting the bandwidth of the smoothing filter based on the comparison.

2. The method of claim 1, further comprising:
   calculating a number of smoothing errors based on the comparison, the number of smoothing errors being based on a number of subcarriers whose power exceeds the threshold power.

3. The method of claim 2, wherein if the number of smoothing errors is equal to zero, the bandwidth of the smoothing filter is decreased by a first predetermined amount.

4. The method of claim 2, wherein if the number of smoothing errors is greater than a threshold value, the bandwidth of the filter is increased by a second predetermined amount.

5. The method of claim 2, wherein if the number of smoothing errors is greater than zero and lower than a threshold value, the bandwidth of the filter remains unchanged.

6. The method of claim 4, wherein the threshold value is a dynamic value and is based on an operating environment.

7. The method of claim 2, wherein:
   if the number of smoothing errors is greater than a threshold value within a predetermined interval, a counter is increased by a first increment;
   if the number of smoothing errors is equal to zero within the predetermined interval, the counter is decreased by a second increment; and
   adjusting the bandwidth of the smoothing filter based on a value of the counter at the end of the predetermined interval.

8. The method of claim 7, wherein:
   the threshold value is a first threshold value;
   if the value of the counter at the end of the predetermined interval is greater than a second threshold value, the bandwidth of the filter is increased by a first predetermined amount; and
   if the value of the counter at the end of the predetermined interval is less than the second threshold value, the bandwidth of the smoothing filter is decreased by a second predetermined amount, wherein the second threshold value is a dynamic value and is based on an operating environment.

9. The method of claim 1, further comprising:
   calculating a plurality of power values, each power value corresponding to one of the error values;
   calculating the threshold power based on an average of the plurality of power values.

10. The method of claim 1, further comprising:
    receiving a data stream contained in a RF signal;
    equalizing the received data stream by the equalizer;
    restoring data bits by a decision engine based on the equalized received data stream; and
    generating a reconstructed data stream from the data bits.

11. The method of claim 10, wherein the plurality of channel response estimates are generated based on the reconstructed data stream and the received data stream having a time delay.

12. The method of claim 10, wherein the decision engine is a hard decision engine.

13. The method of claim 10, wherein the decision engine is a FEC Decoder.

14. The method of claim 1, wherein obtaining the mean error vector further comprises:
   receiving one of the plurality of error vectors;
   storing the received error vector in a memory storage; and
   averaging all error vectors stored in the memory storage to obtain the mean error vector.

15. The method of claim 1, further comprising:
   calculating a power of smoothing errors, the power of smoothing errors being based on a sum of differences between the power of each subcarrier exceeding the threshold power and the threshold power.

16. The method of claim 15, wherein if the power of the smoothing errors is equal to zero, the bandwidth of the smoothing filter is decreased by a first predetermined amount.

17. The method of claim 15, wherein if the power of the smoothing errors is greater than a threshold value, the bandwidth of the filter is increased by a second predetermined amount.

18. The method of claim 15, wherein if the power of smoothing errors is greater than zero and lower than a threshold value, the bandwidth of the filter remains unchanged.

19. The method of claim 15, wherein:
   if the power of smoothing errors is greater than a threshold value within a predetermined interval, a counter is increased by a first increment;
   if the power of smoothing errors is equal to zero within the predetermined interval, the counter is decreased by a second increment; and
   adjusting the bandwidth of the smoothing filter based on a value of the counter at an end of the predetermined interval.

20. An OFDM communication system having an adjustable bandwidth frequency domain smoothing filter for channel tracking loop, comprising:
   a smoothing filter;
   an equalizer;
   one or more processors; and
   a memory storage device containing instructions which when executed, cause the one or more processors to perform the steps of:
   providing to the smoothing filter a plurality of channel response estimates, each channel response estimate corresponding to a symbol and a subcarrier;
   receiving, from the smoothing filter, a plurality of filtered channel response estimates, each filtered channel response estimate corresponding to a value of the channel response estimate;
   calculating a plurality of error vectors, each having a plurality of error values, each error value being a difference between the channel response estimate and the filtered channel response estimate;
   obtaining a mean error vector having a plurality of mean error values, each mean error value corresponding to a subcarrier for all symbols;
   calculating a power of each subcarrier based on the plurality of mean error values of the mean error vector;
   comparing the power of each subcarrier to a threshold power; and
   adjusting the bandwidth of the smoothing filter based on the comparison.

* * * * *